US006344894B1

(12) United States Patent
Liou

(10) Patent No.: US 6,344,894 B1
(45) Date of Patent: Feb. 5, 2002

(54) OPTICAL AXIS ADJUSTING STRUCTURE FOR A RANGE FINDER

(75) Inventor: Charles Liou, Taichung Hsien (TW)

(73) Assignee: Asia Optical Co., LTD, Taichung (TW)

( * ) Notice: Subject to any disclaimer, the term of this patent is extended or adjusted under 35 U.S.C. 154(b) by 0 days.

(21) Appl. No.: 09/677,840

(22) Filed: Oct. 3, 2000

(30) Foreign Application Priority Data

Jan. 5, 2000 (TW) ........................................ 089200115

(51) Int. Cl.7 ................................................. G01C 3/08
(52) U.S. Cl. ..................................................... 356/4.01
(58) Field of Search .............................. 356/4.01, 4.02, 356/4.03, 4.04, 4.05, 4.06, 4.07, 4.08, 4.09, 4.1, 5.01, 5.02, 5.03, 5.04, 5.05, 5.06, 5.07, 5.08, 5.09, 5.1, 5.11, 5.12, 5.13, 5.14, 5.15, 27, 28, 28.5, 141.1, 141.2

(56) References Cited

U.S. PATENT DOCUMENTS

| 4,165,936 | A | * | 8/1979 | Eisenring et al. | ............... 356/5 |
|---|---|---|---|---|---|
| 5,291,263 | A | * | 3/1994 | Kong | .............................. 356/5 |
| 5,517,297 | A | * | 5/1996 | Stenton | ...................... 356/4.01 |
| 5,694,202 | A | * | 12/1997 | Mladjan et al. | ............. 356/4.01 |
| 5,774,208 | A | * | 6/1998 | Abe | ........................... 356/4.01 |
| 5,781,281 | A | * | 7/1998 | Miyano | ..................... 356/4.01 |
| 6,031,606 | A | * | 2/2000 | Bayer et al. | ............. 356/141.5 |

* cited by examiner

*Primary Examiner*—Thomas H. Tarcza
*Assistant Examiner*—Brian Andrea
(74) *Attorney, Agent, or Firm*—Browdy and Neimark

(57) ABSTRACT

An optical axis adjusting structure for a range finder including a range finder that includes a laser emitter, a telescope, and a laser receiver. The laser emitter is provided on the optical axis adjusting device such that a laser beam emitted thereby travels through a predetermined part of the interior of the telescope to project from the range finder. The optical axis adjusting device includes a first coupling portion that is secured on a predetermined part of the range finder, a second coupling portion having a predetermined part secured to the laser emitter with the other part provided on the first coupling portion such that it can reciprocatingly displace along a first direction, and at least one securing element provided between the first and second coupling portions to limit the relative position of the first and second coupling portions.

7 Claims, 4 Drawing Sheets ns OPTICAL AXIS ADJUSTING STRUCTURE
FOR A RANGE FINDER

BACKGROUND OF THE INVENTION (a) Field of the Invention

The present invention relates to a laser range finder in which the laser beams pass through the interior of a telescope unit thereof, more particularly an adjusting device adapted to adjust the optical axis of the laser beams and the observation optical axis of the telescope unit so that they overlap.

(b) Description of the Prior Art

The structure of a conventional range finder utilizing laser beams in generally includes cylindrical and juxtaposed laser generator, laser receiver, and a telescope unit. Since the three-cylinder structure will make the range finder bully use thereof is not convenient.

There has been provided a technique in which a laser generator has a part of the laser beam emitted thereby pass through the interior of the lens cylinder of the telescope unit before being projected out of the range finder, whereby the range finder appears like a dual-cylinder construction with a reduced size.

In the dual-cylinder type range finder, the travel path of the invisible laser beams emitted from the range finder to the object to be observed enter the travel path of the interior of the telescope unit along with the visible light beams emitted by the object to be observed, a part of thereof sharing the lens cylinder of the telescope. Therefore, the higher the degree of coincidence of the two travel paths becomes, the greater the accuracy of the results of measurement can be obtained. Hence, during assembly or maintenance of the range finder, a suitable design must be employed to enable the operator to adjust the two paths in an overlapping state.

SUMMARY OF THE INVENTION

A primary object of the present invention is to provide an optical axis adjusting device for range finders, in which invisible light beams and a part of the visible light beams can be overlapped.

Another object of the present invention is to provide an optical axis adjusting device for range finders which can alter the size of the included angle between the optical axis of the invisible light beam and the centerline of the telescope unit.

A further object of the present invention is to provide an optical axis adjusting device for range finders which can alter the advancing path of the invisible light beam inside the telescope unit.

In order to achieve the above-mentioned objects, the optical axis adjusting device for range finders according to the present invention includes a range finder that includes a laser emitter, a telescope, and a laser receiver. The laser emitter is provided on the optical axis adjusting device such that a laser beam emitted thereby travels through a predetermined part of the interior of the telescope to project from the range finder. The optical axis adjusting device includes a first coupling portion that is secured on a predetermined part of the range finder, a second coupling portion having a predetermined part secured to the laser emitter with the other part provided on the first coupling portion such that it can reciprocatingly displace along a first direction, and at least one securing element provided between the first and second coupling portions to limit the relative position of the first and second coupling portions.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
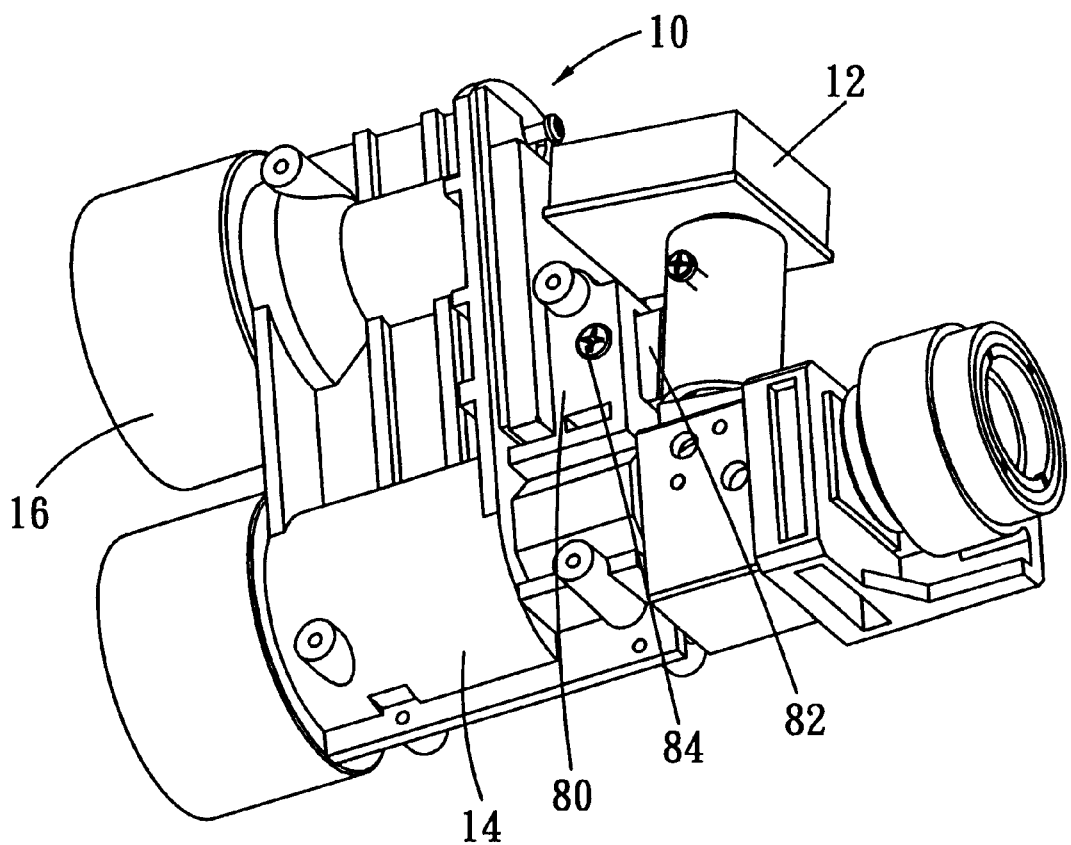
FIG. 1 is a perspective view of a preferred embodiment adapted for use in a range finder.
Figure 2:
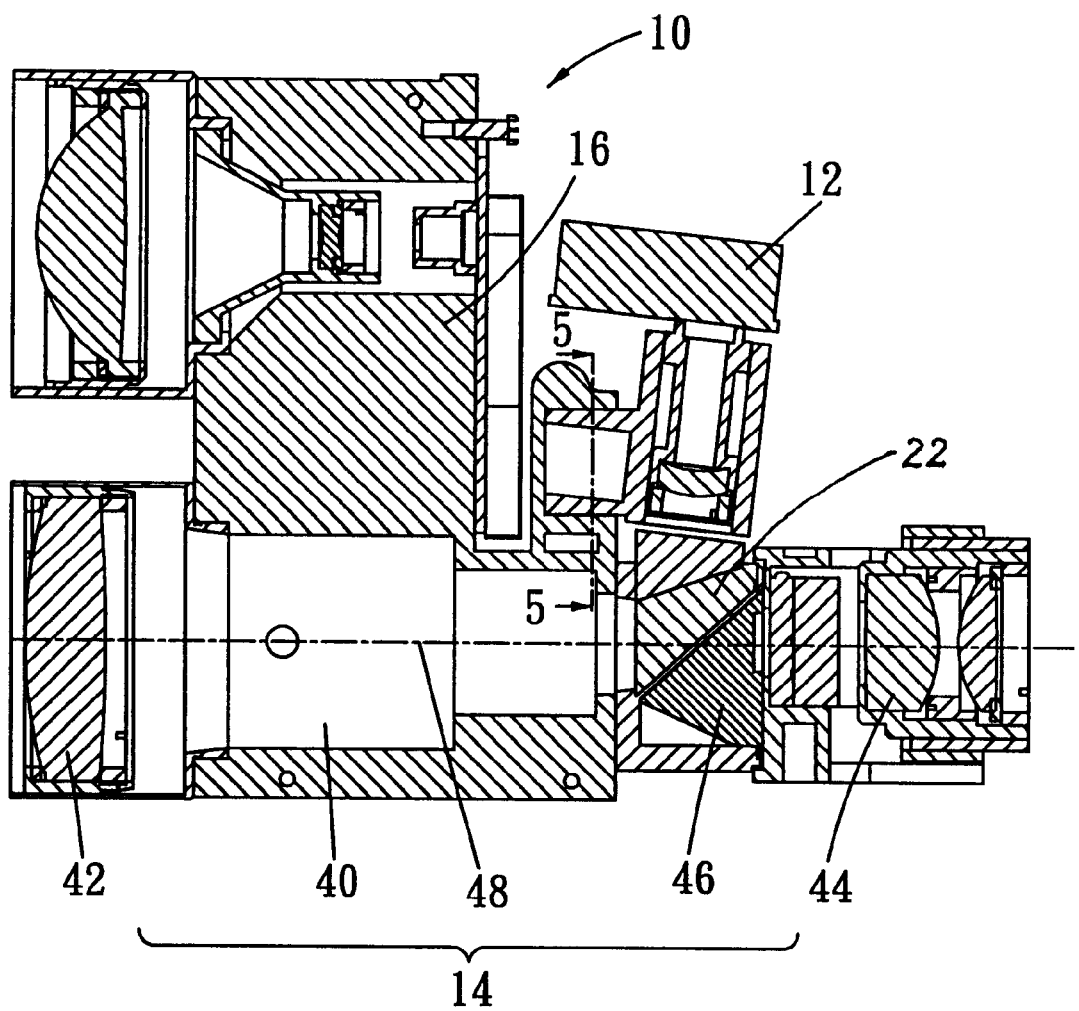
FIG. 2 is a sectional view taken along a longitudinal axis of FIG. 1.

With reference to the drawings, a range finder 10 of the present invention mainly includes a laser emitter 12, and a telescope 14 and a laser receiver 18 in a juxtaposed relationship.

The telescope 14 includes a lens cylinder 40 and an object lens unit 42 and an eyepiece lens unit 44 disposed on left and right ends of the lens cylinder 40, respectively. The lens cylinder 40 additionally has a pentahedral prism unit 46 disposed in its interior. A visible light optical axis 48 is defined between the object lens unit 42 and the eyepiece lens unit 44. The visible tight optical axis 48 is a light beam that is emitted from the surface of an object (not shown) observed by the user, and that enters the lens cylinder 40 via the object lens unit 42 and reaches the light travel path at the pentahedral prism unit 46. The visible light beam is refracted and reflect by the pentahedral prism unit 46 and then travels to the eyepiece lens unit 44 to enable the user to observe the object to be tested to see if it is within the observation range of the telescope 14.

The laser emitter 12 is provided on an upper part of the telescope 14 and just corresponds to the upper part of the pentahedral prism unit 46. The interiors of the telescope 14 and the pentahedral prism unit 46 can, via a suitable path (not shown) enable the invisible light beam emitted by the laser emitter 12 to travel along the path into the interior of the lens cylinder 40 of the telescope 14 and go through the object lens unit 42 via a deflective prism unit 22 to reach the surface of the object to be observed and then turn back to the range finder 10.

The laser receiver 16 is also provided on an upper part of the telescope 14 and is disposed to be substantially parallel to the direction of the longer axis of the telescope so that it can receive the laser beam returned from the surface of the object to be observed.

Figure 3:
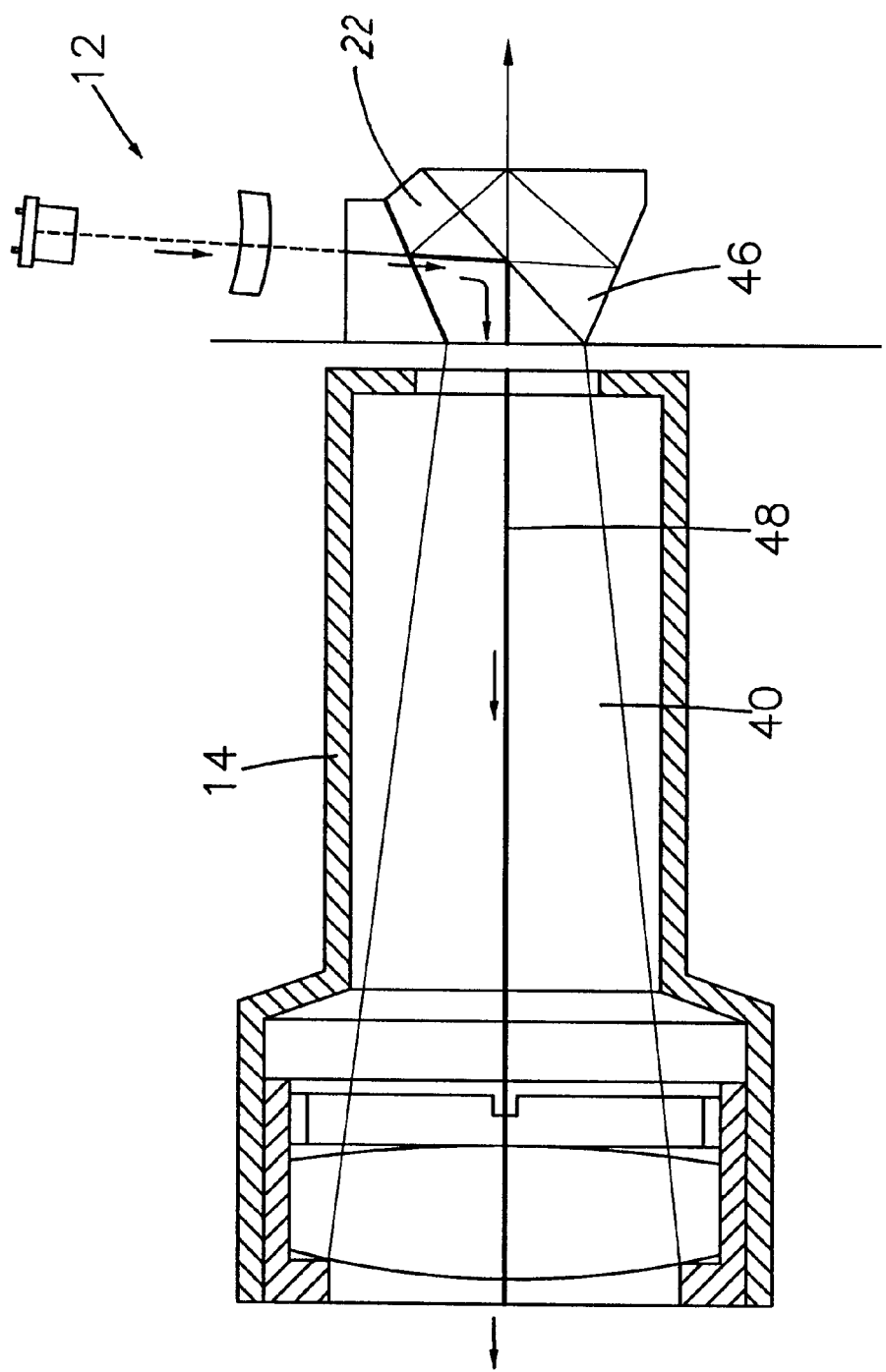
FIG. 3 is a sectional view showing the optical axis direction of the referred embodiment.
Figure 4:
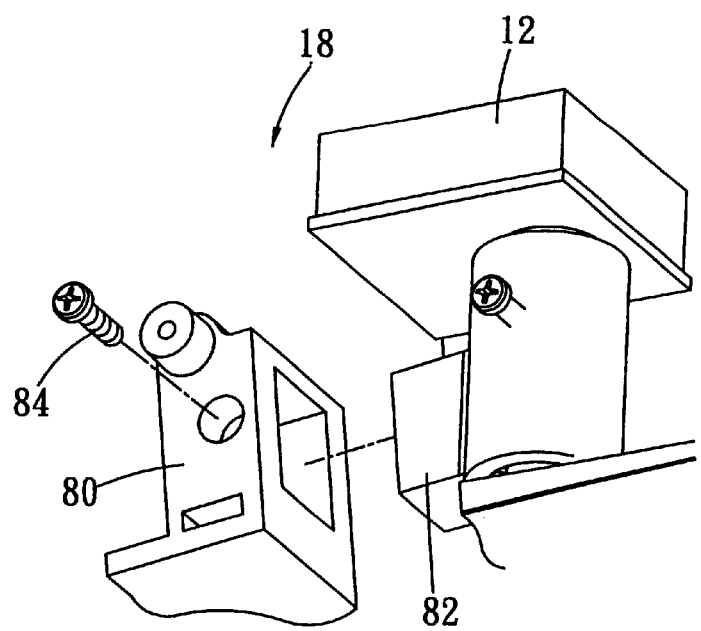
FIG. 4 is a perspective view of the adjusting device of the preferred embodiment.

Referring to FIG. 3, which illustrates the laser beam emitted by the laser emitter 12 passes through a center axis line of the interior of the lens cylinder 40 to be emitted from a front end of the telescope 14. The laser beam refracted from the surface of the object to be observed enters once again the laser receiver 16. Then, a predetermined circuit to match the laser pulses of the laser emitter 12 to calculate the distance between the object observed and the range finder.

In the observation process as described above, in order to enhance the precision of the range finder 10 in measuring distance, the manufacturer has to cause the direction of the invisible optical axis of the advancing laser beam to coincide with the direction of the visible light optical axis 48. To facilitate manufacturer in assembling or maintaining the range finder 10 to make it easier to cause the two optical axes to overlap or coincide, the range finder of the present invention further includes an adjusting device 18.

The adjusting device 18 includes a first coupling portion 80, a second coupling portion 82 and a pair of securing elements 84. The first coupling portion 80 is provided on the housing of the telescope 14 in the form of a recess having a suitable depth and a rectangular cross section. The second coupling portion 82 is provided on the housing of the laser emitting 12 in the form of a rectangular post having a suitable length and an external diameter smaller than the internal diameter of the first coupling portion 80. The second coupling 82 is capable of reciprocating along the axis of the rectangular post into the first coupling portion 80. The securing elements 84 are threaded rods of a suitable length, and are provided on the periphery of the first coupling portion 80 in the same direction with a longer axis direction thereof extends along the same linear line, and the inner side end thereof extending to the inner edge of the first coupling portion 80 to abut against the outer edge of the second coupling portion 82, whereby the second coupling portion 82 can be firmly held in the first coupling portion 80. When the user releases the two securing elements 2, the relative position between the first and second coupling portions 80, 82 can be re-adjusted to enable the laser beam emitted by the laser generator 12 that passes through the deflective prism unit 22 to be aligned with the visible light optical axis.

Figure 5:
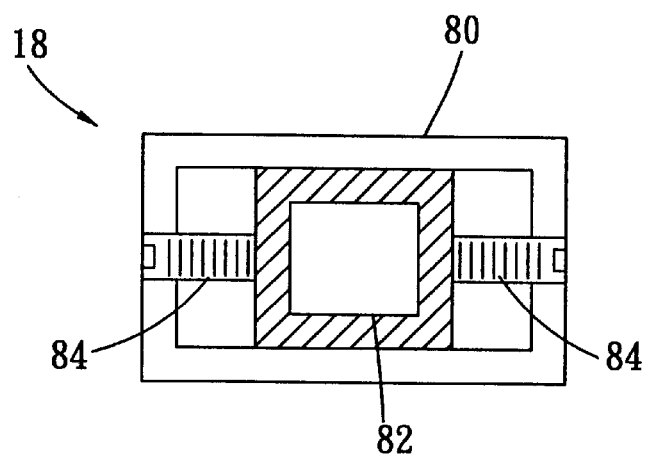
FIG. 5 is a sectional view taken along line 5—5 of FIG. 1.

With reference to FIG. 5, the second coupling portion 82 is configured to have a transverse width (left to right) greater than the left-to-right with of the first coupling portion 80, whereby the first coupling portion 80 can not only move back and forth in the second coupling portion 82 but also displace sidewise therein. Furthermore, by changing the extent of projection of the securing elements 84 with respect to the second coupling portion 82, the first coupling portion 80 can still be effectively held tightly. In this embodiment, the upper and lower widths of the first and second coupling portions 80, 82 are configured to be the same (according to the direction shown in FIG. 3), whereby the displacement and positioning of the first coupling portion 80 can be better secured.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical axis adjusting device for a range finder, said range finder comprising a laser emitter, a telescope, and a laser receiver, said laser emitter being provided on said optical axis adjusting device such that a laser beam emitted thereby travels through a predetermined part of the interior of said telescope to project from said range finder, said optical axis adjusting device comprising a first coupling portion that is secured on a predetermined part of said range finder, a second coupling portion having a predetermined part secured to said laser emitter with the other part provided on said first coupling portion such that it can reciprocatingly displace along a first direction, and at least one securing element being provided between said first and second coupling portions to limit the relative position of said first and second coupling portions.

2. The optical axis adjusting device for a range finder as defined in claim 1, wherein said second, coupling portion is provided on said first coupling portion such that said second coupling portion is capable of reciprocating along different first and second directions.

3. The optical axis adjusting device for a range finder as defined in claim 2, wherein said first and second directions are perpendicular to each other.

4. The optical axis adjusting device for a range finder as defined in claim 1, wherein said first and second coupling portions are coupled in an inter-sleeved manner.

5. The optical axis adjusting device for a range finder as defined in claim 1, wherein said first coupling portion has a post shape, whereas said coupling post is a recess for receiving said first coupling portion, said securing element entering through an outer edge of said second coupling portion with a rear and end abutting an outer edge of said first coupling portion.

6. The optical axis adjusting device for a range finder as defined in claim 5, wherein said securing element has a predetermined length and is provided with threads for threaded engagement with said second coupling portion.

7. The optical axis adjusting device for a range finder as defined in claim 5, at least including two securing elements, each of said securing elements being provided to reciprocate along the same straight line, said second coupling portion being disposed between said two securing elements.

* * * * *